US00RE36053E

United States Patent [19]

Bush et al.

[11] E Patent Number: Re. 36,053

[45] Reissued Date of Patent: Jan. 19, 1999

[54] COMPACT OLDHAM COUPLING

[75] Inventors: James W. Bush, Skaneateles; Wayne P. Beagle, Chittenango, both of N.Y.

[73] Assignee: Carrier Corporation, Syracuse, N.Y.

[21] Appl. No.: 683,832

[22] Filed: Jul. 18, 1996

Related U.S. Patent Documents

Reissue of:

[64] Patent No.: 5,330,334
Issued: Jul. 19, 1994
Appl. No.: 112,034
Filed: Aug. 26, 1993

[51] Int. Cl.[6] ..... F01C 1/04; F16D 3/04

[52] U.S. Cl. ..... 418/55.3; 464/102

[58] Field of Search ..... 418/55.3; 464/102

[56] References Cited

U.S. PATENT DOCUMENTS

| | | | |
|---|---|---|---|
| 1,769,107 | 7/1930 | Brown | 464/102 |
| 5,141,417 | 8/1992 | Bush | 418/55.3 |

FOREIGN PATENT DOCUMENTS

| | | |
|---|---|---|
| 0479412 | 4/1992 | European Pat. Off. . |
| 0479412A1 | 4/1992 | European Pat. Off. . |

*Primary Examiner*—John J. Vrablik

[57] ABSTRACT

A pair of keys of an Oldham coupling are located on a chord spaced from a diameter and are of a parallelogram shape. The ends of the corresponding slots are located at the same radius whereby a reduced envelope results.

4 Claims, 4 Drawing Sheets

COMPACT OLDHAM COUPLING

Matter enclosed in heavy brackets [ ] appears in the original patent but forms no part of this reissue specification; matter printed in italics indicates the additions made by reissue.

BACKGROUND OF THE INVENTION

In scroll machines such as compressors there are two scroll members which must be held to relative orbiting motion. Commonly, one of the scroll members is called a fixed scroll and the other scroll member is called an orbiting scroll. An Oldham coupling can be employed to hold the fixed and orbiting scrolls to a relative orbiting motion. To achieve this, the Oldham coupling reciprocates with respect to the crankcase while the orbiting scroll reciprocates with respect to the Oldham coupling. The coactions are those of slots and keys and the Oldham coupling surrounds the hub of the orbiting scroll and possibly the axial compliance or support structure. Movement of the Oldham coupling usually takes place within diameters. When considering the need to keep the keys in their slots for their full strokes and the need to avoid interfering with the axial compliance or support structure, there can be a significant increase in the envelope required to contain the Oldham coupling and the housing in which it is located. Alternatively, there can be a significant reduction in the envelope available for the axial compliance or support structure.

European Patent Application 0 479 412 A1 discloses an Oldham coupling of an oval shape with one pair of keys located on a chord of a circular section of the oval but located on "outwardly projecting flange portions". These projecting flange portions extend beyond the diameter of the circular section. This achieves some reduction in the required envelope by positioning the keys in regions where more operating space may be available.

SUMMARY OF THE INVENTION

One, or both, of the keys of a scroll compressor can be located on chords. The keys are configured to the shape of the corresponding ring portion of the coupling, namely a parallelogram. A diametral location yields a special case of a parallelogram, the rectangle, and the sides are coextensive as are those of the slot. As you move from a diameter towards a tangent, the sides in the direction of movement become less coextensive but the length of the slots increase. The present invention configures the slots to the keys.

It is an object of this invention to reduce the radial clearance needed for anti-rotation mechanisms.

It is a further object of this invention to maximize the size of the internal structure while keeping the external structure constant.

It is an additional object of this invention to reduce the overall size of the surrounding structure while maintaining the size of the structure internal to the Oldham coupling. These objects, and others as will become apparent hereinafter, are accomplished by the present invention.

Basically, at least one set of keys of an Oldham coupling are located on a chord and are shaped generally like the underlying portions of the ring.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
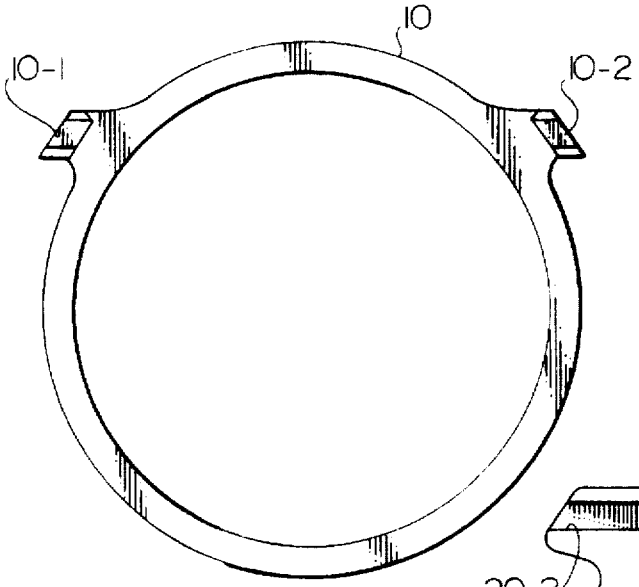
FIG. 1 is a top view of the Oldham coupling of the present invention.
Figure 2:
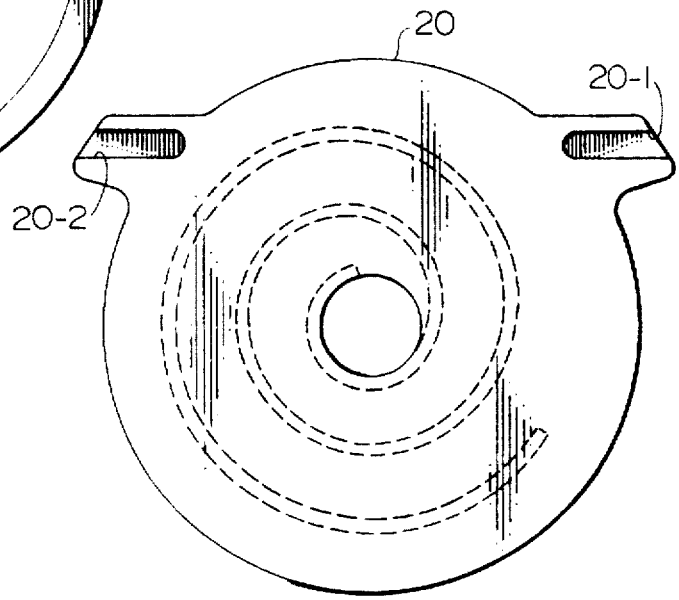
FIG. 2 is a bottom view of an orbiting scroll of the present invention.
Figure 3:
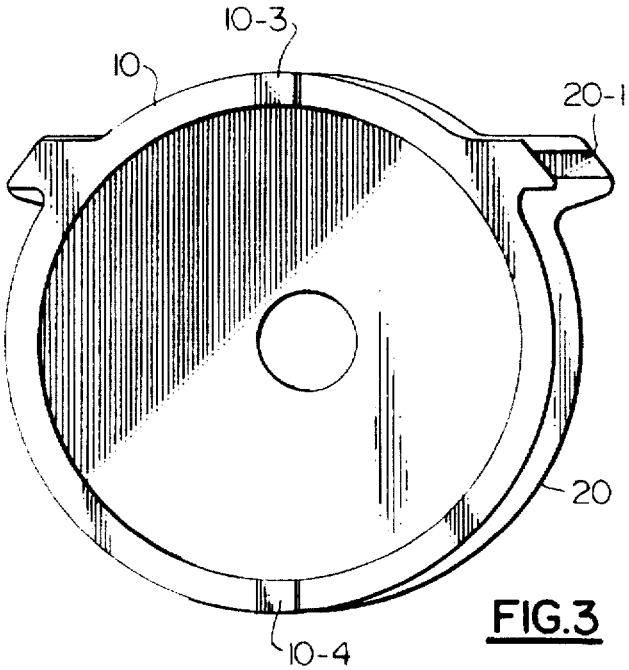
FIG. 3 is a bottom view of the Oldham coupling of FIG. 1 engaging the orbiting scroll of FIG. 2.
Figure 4A:
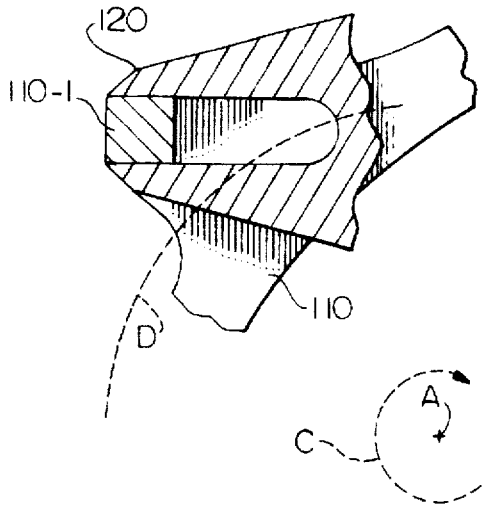
FIG.4A Prior Art
FIGS. 4A–4D represent a PRIOR ART key and slot coaction at 90° intervals.
Figure 4B:
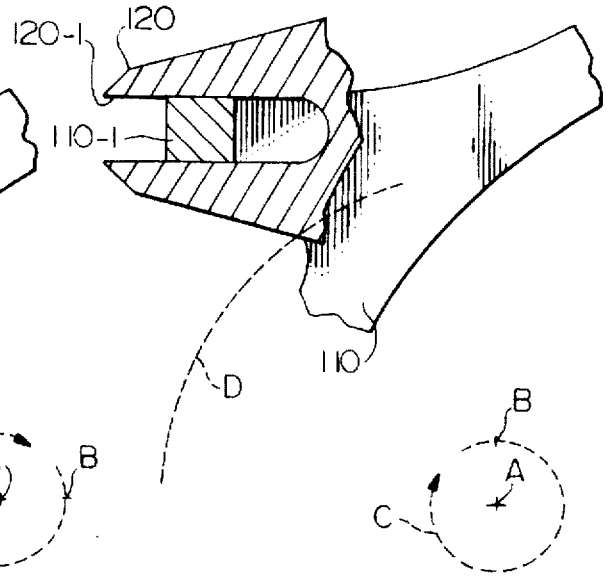
FIG.4B Prior Art
Figure 4D:
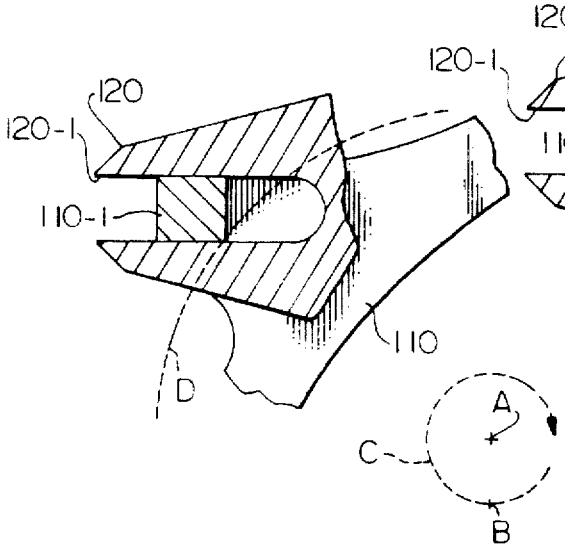
FIG.4D Prior Art
Figure 4C:
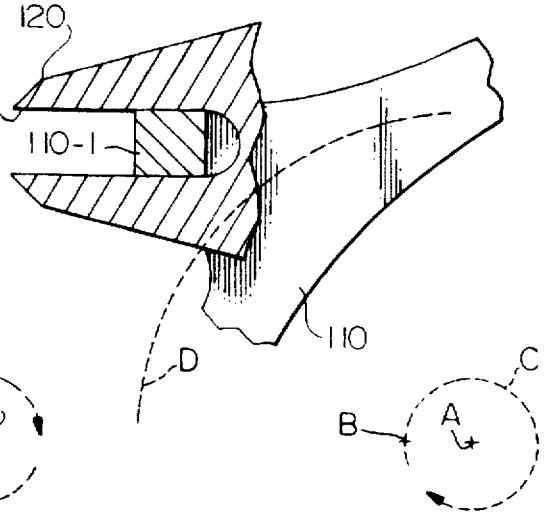
FIG.4C Prior Art

In FIGS. 1–3, 5A–5D and 7, the numeral 10 generally designates an Oldham coupling made according to the teachings of the present invention. Oldham coupling 10 has a first pair of keys 10-1 and 10-2 which are located on a chord significantly displaced from a diameter. As is best shown in FIG. 3, a second pair of keys 10-3 and 10-4 is located on a line, specifically, as illustrated, a diameter. The line on which keys 10-3 and 10-4 are located is perpendicular to the cord on which keys 10-1 and 10-2 are located, but on opposite sides of the Oldham coupling 10.

In FIGS. 2, 3, 5A–5D and 7, the numeral 20 generally designates an orbiting scroll of a scroll compressor. Orbiting scroll 20 has a pair of slots 20-1 and 20-2 which respectively receive and coact with keys 10-1 and 10-2. As would be conventional, keys 10-3 and 10-4 would coact with corresponding slots in crankcase 40 such that coupling 10 would be held to a reciprocating motion. Similarly, the coaction of keys 10-1 and 10-2 with slots 20-1 and 20-2 would hold orbiting scroll 20 to a reciprocating motion with respect to the coupling 10 which is moving at a right angle thereto. As a result the orbiting scroll 20 is held to an orbiting motion with respect to the member, crankcase 40, that keys 10-3 and 10-4 coact with.

Figure 6:
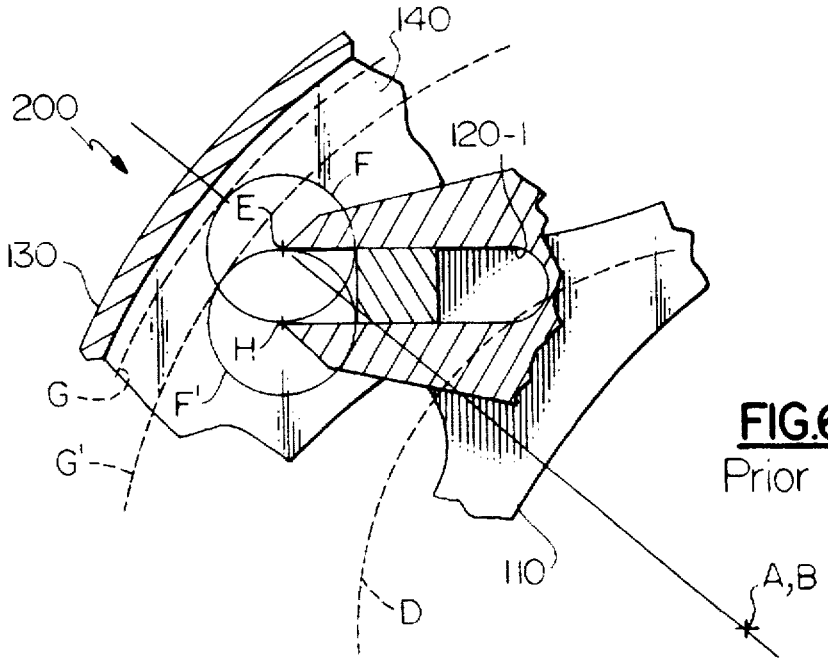
FIG.6 Prior Art
FIG. 6 is a composite of the motion of FIGS. 4A–4D of the PRIOR ART device showing all of the parts on center.

In FIGS. 4A–4D and 6 the numeral 110 generally designates a PRIOR ART Oldham coupling with a conventional rectangular key 110-1 located on a chord. An orbiting scroll 120 has a slot 120-1 coacting with key 110-1. The letter A designates the axis of the crankshaft of the scroll compressor 200. The letter B designates the axis of the eccentric driving the orbiting scroll 120 as well as the axis of scroll 120. FIG. 6 illustrates the parts on center, with A and B coaxial whereas FIGS. 4A–4D illustrate the relationship of the parts with B orbiting A at 90° intervals around orbit path C. Circle segment D represents the maximum clearance for solid internal components and/or clearances around the thrust bearing, etc. Building in from the inner radius of shell 130 of compressor 200 in FIG. 6, the key location is determined, as illustrated, through the upper left corner of slot 120-1 which runs closest to the shell 130, a position about midway between that of FIGS. 4B and 4C. It will be noted that coupling 110 is only capable of reciprocating movement in a vertical direction, as illustrated, with respect to crankcase 140 which underlies coupling 110 and has slots (not illustrated) which coact with keys (not illustrated) on coupling 110 in a conventional manner. The largest radius, corresponding to curve D, of the internal structure is determined by the key corner at the lower right, a position corresponding to that of FIG. 4D.

Referring specifically to FIG. 6, the parts are on center so that axes A and B are coaxial. E is the upper, outer point of key slot 120-1 and F is the circle defining the orbit path of point E as orbiting scroll 120 orbits. It should be noted that circles C and F are identical except for their locations. The curve G represents the minimum enclosing space and is only separated from the interior of shell 130 by design clearances. If point H rather than point E was the determining point for the minimum enclosing space, then circle F' which is the same as F and C, but displaced, would determine the location of the new, reduced enclosing space defined by curve G'.

Figure 7:
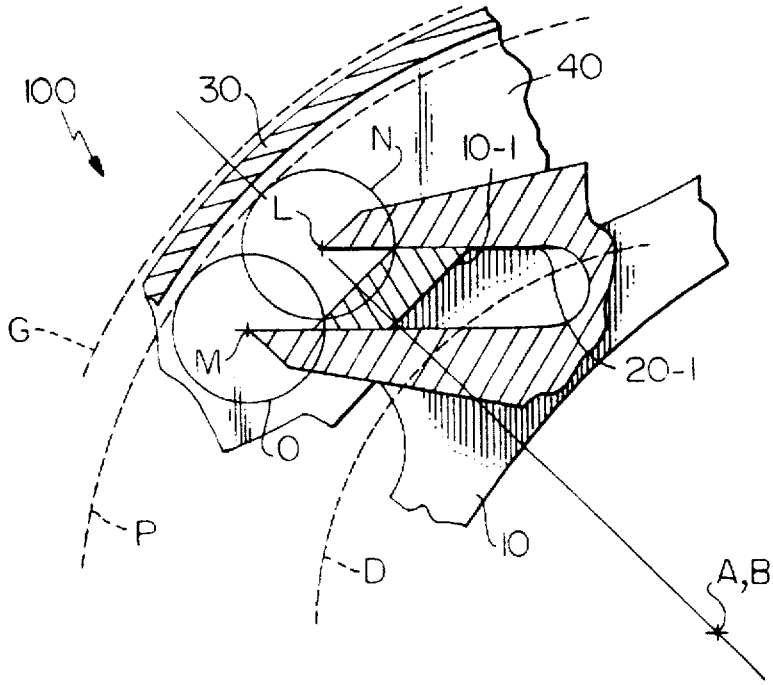
FIG. 7 is a composite of the motion of FIGS. 5A–5D of the present invention showing the reduced envelope required.

In FIGS. 5A–5D and 7, the letter A designates the axis of the crankshaft of scroll compressor 100 having a shell 30. The letter B designates the axis of the eccentric driving the orbiting scroll 20 as well as the axis of scroll 20. FIG. 7 illustrates the parts on center, with A and B coaxial whereas FIGS. 5A–5D illustrate the relationship of the parts with B orbiting A at 90° intervals around orbit path C. Circle D represents the maximum clearance for solid internal components. Points A and B, path C and circle D are the same values in FIGS. 4A–4D, 5A–5D, 6 and 7.

Figure 5A:
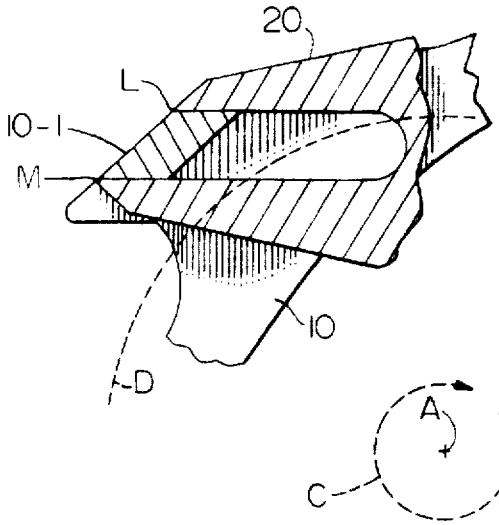
FIGS. 5A–5D represent the coaction of a key and slot of the present invention at 90° intervals.
Figure 5B:
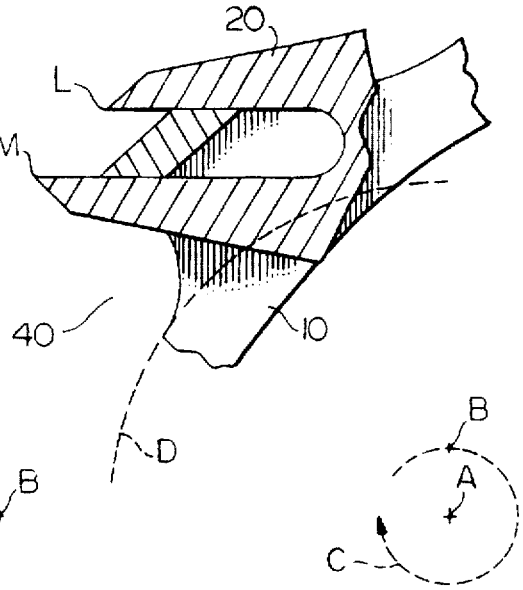
Figure 5D:
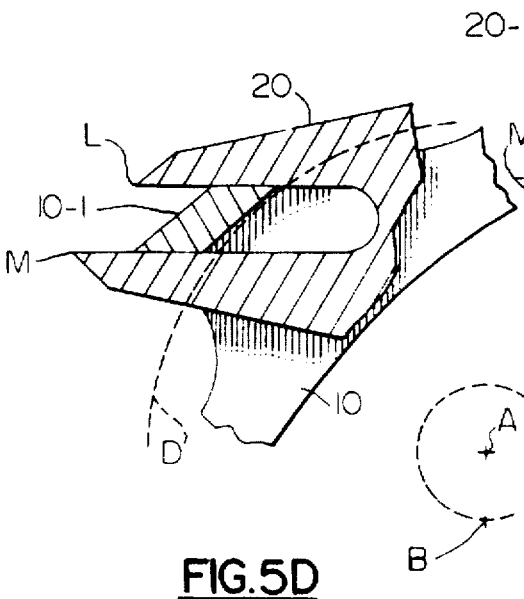
Figure 5C:
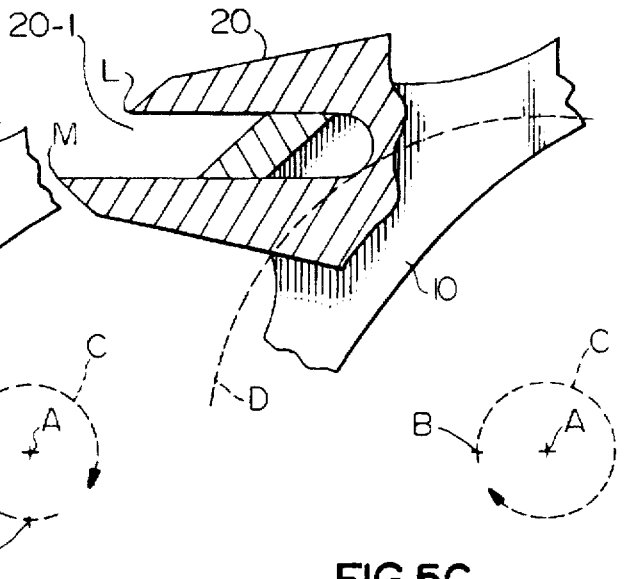

Referring specifically to FIG. 7, the parts are on center so that axes A and B are coaxial. Points L and M, which correspond to points E and H, respectively, of FIG. 6, are independently laid out with respect to the outer operating envelope or minimum enclosing space which is represented by curve G' in FIG. 6. As a result, circles N and O which respectively define the orbit paths of points L and M are tangent to the same curve, P, which represents the outer operating envelope or minimum enclosing space and corresponds to curve G' of FIG. 6 and represents a space saving defined by the difference of G and G' in FIG. 6 and roughly by the difference of P and superimposed G in FIG. 7. *Because all points of orbiting members orbit within the same size circular path, circles N and O are of the same size and, since circles N and O are tangent to the same circular curve P which represents the outer operating envelope, then L and M, the centers of circles N and O, are equally spaced from circular curve P. Further, since P is a spaced clearance from the interior of shell 30, then L and M are also equally spaced from shell 30. Referring to FIG. 5A it is readily seen that the outer surface of key 10-1 is effectively defined by a line through points L and M with the two corner points of key 10-1 falling on curve P in their extreme outermost position of orbit defined by circles N and O, respectively, as illustrated in FIG. 7.* In choosing points L and M the result is a parallelogram-shaped key 10-1 since L and M, as best shown in FIG. 5A, represent the extremes of movement of key 10-1 within slot 20-1. Key 10-1 has the same contact area with the sides of slot 20-1 as key 110-1 has with slot 120-1.

While the present invention has been specifically described in terms of a single slot and key coaction it is clear that the operation of the other key and slot of the pair would function in a mirror operation.

Although a preferred embodiment of the present invention has been illustrated and described, other changes will occur to those skilled in the art. For example, rather than decreasing the size of the shell required, the present invention can provide an increased clearance in the same shell. Also, the keys 10-3 and 10-4 can coact with a member. It is therefore intended that the scope of the present invention is to be limited only by the scope of the appended claims.

What is claimed is:

1. A scroll machine having a shell with an axis containing a reference member, a coupling member and a scroll member with said coupling member coacting with said reference member and said scroll member such that said scroll member is held to an orbiting motion with respect to said reference member wherein:

said coupling member is generally ring-shaped and has a center and a first pair of keys on a first side with said first pair of keys being located on a chord spaced from said center and said axis;

said first pair of keys being of a parallelogram shape with one pair of opposing sides of said parallelogram being parallel to said chord;

said scroll member having a pair of slots parallel to said chord for receiving said first pair of keys and coacting therewith;

each slot of said pair of slots extending to an outer edge of said scroll member with each portion of said edge corresponding to said slot being essentially equally spaced from said axis when said corresponding edge is closest to said shell;

an outermost one of each second pair of opposing sides of said parallelogram being essentially continuous with said portion of said edge corresponding to a corresponding slot when said corresponding edge is closest to said shell whereby a reduced envelope is obtained.

2. The scroll machine of claim 1 wherein said coupling member has a second pair of keys coacting with said reference member.

*3. A scroll machine having a shell with an axis containing a reference member, a coupling member and a scroll member with said coupling member coacting with said reference member and said scroll member such that said scroll member is held to an orbiting motion with respect to said reference member wherein:*

*said coupling member is generally ring-shaped and has a center and a first pair of keys on a first side with said first pair of keys being located on a chord spaced from said center and said axis;*

*said first pair of keys each having a pair of opposing sides which are parallel to said chord and of generally equal length;*

*said scroll member having a pair of slots parallel to said chord for receiving said first pair of keys and coacting therewith;*

*each slot of said pair of slots extending to an outer edge of said scroll member with each portion of said edge corresponding to said slot being essentially equally spaced from said axis when said corresponding edge is closest to said shell;*

*an outermost one of a second pair of sides of each of said first pair of keys being essentially continuous with said portion of said edge corresponding to a corresponding slot when said corresponding edge is closest to said shell whereby a reduced envelope is obtained.*

*4. The scroll machine of claim 3 wherein said coupling member has a second pair of keys coacting with said reference member.*

* * * * *